United States Patent
Linden et al.

(12) 
(10) Patent No.: US 6,360,254 B1
(45) Date of Patent: Mar. 19, 2002

(54) SYSTEM AND METHOD FOR PROVIDING SECURE URL-BASED ACCESS TO PRIVATE RESOURCES

(75) Inventors: Gregory D. Linden, Seattle; Michael D. McDaniel, Redmond; Ryan J. Snodgrass, Kirkland; Joel R. Spiegel, Woodinville, all of WA (US)

(73) Assignee: Amazon.com Holdings, Inc., Seattle, WA (US)

( * ) Notice: Subject to any disclaimer, the term of this patent is extended or adjusted under 35 U.S.C. 154(b) by 0 days.

(21) Appl. No.: 09/280,513

(22) Filed: Mar. 30, 1999

Related U.S. Application Data

(60) Provisional application No. 60/100,297, filed on Sep. 15, 1998.

(51) Int. Cl.[7] .............................................. G06F 13/00
(52) U.S. Cl. ...................... 709/219; 709/206; 709/225; 713/201
(58) Field of Search ................................. 709/203, 206, 709/217, 219, 223, 224, 225, 313, 329; 713/201

(56) References Cited

U.S. PATENT DOCUMENTS

| | | |
|---|---|---|
| 5,708,780 A | 1/1998 | Levergood et al. |
| 5,790,793 A | 8/1998 | Higley |
| 5,812,769 A | 9/1998 | Graber et al. |
| 6,038,597 A  * | 3/2000 | Van Wyngarden .......... 709/219 |
| 6,192,407 B1 | 2/2001 | Smith et al. |

* cited by examiner

Primary Examiner—Viet D. Vu
(74) Attorney, Agent, or Firm—Knobbe, Martens, Olson & Bear LLP

(57) ABSTRACT

In a Web site system in which different private records or other resources are personal to different users, a method is provided for allowing users to securely access a private resource without the need to enter a username, password, or other authentication information, and without the need to download special authentication software or data to the user's computer. Each resource is assigned a private uniform resource locator (URL) which includes a fixed character string and a unique token, and the URLs are conveyed by email (preferably using hyperlinks) to users that are entitled to access such resources. The tokens are generated using a method which distributes the tokens substantially randomly over the range of allowable token values ("token space"). The token space is selected to be sufficiently large relative to the expected number of valid tokens to inhibit the identification of valid tokens through trial and error. When a user attempts to access a private URL (such as to access a private account information page), a token validation program is used to determine whether the token is valid. The method may be used to provide users secure to access private account information on the Web site of merchant. Other practical applications include electronic gift certificate and coupon redemption, gift registries, order confirmation electronic voting, and electronic greeting cards.

36 Claims, 12 Drawing Sheets amazon.com

Completing Your Gift Certificate Order is Easy

Please fill in the following information:

1. Please enter your name and the recipient's name:

From: Erin

To: Helaine

2. Please type the message you would like to appear on the gift certificate: (optional)

Message: Happy Birthday Mom!!

3. Gift Certificate amount in U.S. dollars: $ 40 (minimum $10.00)

4. Gift Certificate amount in U.S. dollars:

⊙ E-mail. Please enter the recipient's e-mail address:
   Helaine@aol.com

○ Paper mail. We will ask you for the recipient's mailing address later

5. Your Information

Please enter your e-mail address: Erin@earthlink.net

○ I am a first-time customer. (You will be asked to create a password later on)

○ I am a returning customer, and my password is

Have you forgotten your password?

IMPORTANT: Press this button to continue to the next page. You will still have a chance to cancel or change your order.

FIG. 8

SYSTEM AND METHOD FOR PROVIDING SECURE URL-BASED ACCESS TO PRIVATE RESOURCES

RELATED APPLICATIONS

This application claims the benefit of U.S. provisional appl. No. 60/100,297, filed Sep. 15, 1998.

FIELD OF THE INVENTION

The present invention relates to electronic commerce and user authentication. More particularly, the invention relates to methods for enabling users of a Web site or other information system to efficiently and securely access private Web pages and other types of restricted resources.

BACKGROUND OF THE INVENTION

In the field of Internet commerce, it is common for businesses to provide customers restricted access to data, server functionality, and other types of resources via a Web site. For example, a user of an online merchant's Web site may be given restricted access to a database record which contains the user's account information, or to a Web page which allows the user to place an order with the merchant.

To prevent unauthorized users from accessing restricted resources, the user is typically required to initially specify, and thereafter enter, some type of authentication information. The authentication information may include, for example, a user ID, a password, an email address, or a combination thereof. Requiring the user to enter and keep track of such information, however, can be burdensome to the user. In addition, the level of security provided by such methods depends heavily on the length and predictability of the identifiers selected by the users.

There is therefore a need for an improved method for allowing users of Web sites to securely access private data and other resources.

SUMMARY OF THE INVENTION

The present invention addresses the above and other limitations by providing a system and method in which users access private Web pages, data records and/or other restricted resources using automatically-generated private URLs (Uniform Resource Locators). The private URLs allow authorized users to access the private resources without the need to enter a username, password, or other authentication information, and without the need to download special authentication software or data to the user's computer. The system and method are particularly useful for providing users with secure access to data records and functionality associated with a personal account, but may be used in a wide range of other practical applications.

In accordance the invention, each "private resource" (a resource to which remote access by a particular user or group of users is desired) of a set of private resources is automatically assigned a private URL which includes a fixed character string and a unique token. For example, a private Web page for a particular user may be assigned the private URL http://www.amazon.com/private_resources/A9HBJ1E55G0ML, where the character string A9HBJ1E55G0ML is the token. The private URLs are conveyed to the corresponding users by email (preferably within a user-selectable hyperlink) or another communication method, and may be used to access the corresponding resource over the Internet.

To protect against the identification of valid private URLs, such as through trial-and-error, the range of allowable token values ("token space") is selected to be sufficiently large relative to the expected number of valid tokens so that the probability that a random guess within the token space will produce a valid token is very low (e.g., less than 1 in 1000). For example, if no more than $2^{20}$ (about one million) tokens are expected to be valid at any given time, and 64-bit tokens are used (providing a token space of 0 to $2^{64}-1$), the likelihood that a random guess within this range will produce a valid token will be no more than one in $2^{64/220}=2^{44} \cong 1.78 \times 10^{13}$. The token space may, but need not be, continuous. To further protect against the unauthorized identification of valid tokens, the tokens are generated using an algorithm which tends to distribute the issued tokens randomly within the token space. Any of a variety of known algorithms, or combinations of algorithms, may be used for this purpose. The use of such a random distribution reduces the likelihood that an unauthorized user will be able to identify a valid token through modification or observation of other valid tokens.

When the user selects the hyperlink or otherwise requests a private URL, a server application running on the Web site determines whether the token is valid. If the token is found to be valid, the server application permits the user to access the resource. Access to the resource may, for example, involve the generation of a private Web page that is transmitted to the user. The private Web page may include information from one or more private database records, and/or may include a confirmation that a particular transaction associated with the private URL was performed. The server application may be configured to invalidate the tokens (and thus the private URLs) after a single use, or after a predetermined period of time.

One benefit of the above-described URL generation/validation method is that it provides a very simple and efficient mechanism for allowing users to access private resources, such as Web pages which contain personal account information. Another benefit is that the private URLs can be generated and issued to a user (and subsequently validated) even if very little information is known about the user. For example, the method can be used where the only information known about the user is the user's email address, as in the email-based recommendation service described below. Different levels of security can therefore be used for different types of transmissions. Another benefit is that the level of security can be controlled by adjusting the size of the token space, such as by adjusting the number of bits used to represent token values. Another benefit is that the method does not require the user to download any special authentication program, or to consistently use the same computer.

In one embodiment, the method is used to allow users to securely access and update a subscription profile for an automated email-based product recommendation service. Other practical applications for the method include automated order confirmation, electronic gift certificate and coupon redemption, access to gift registries, electronic voting, and access to electronic greeting cards.

BRIEF DESCRIPTION OF THE DRAWINGS

These and other features of the invention will now be described with reference to the drawings of certain preferred embodiments of the invention, in which:

FIGS 8–10 illustrate a form Web page (FIG. 8), an email document (FIG. 9), and a private Web page (FIG. 10) in an electronic gift certificate embodiment of the invention.

Figure 1:
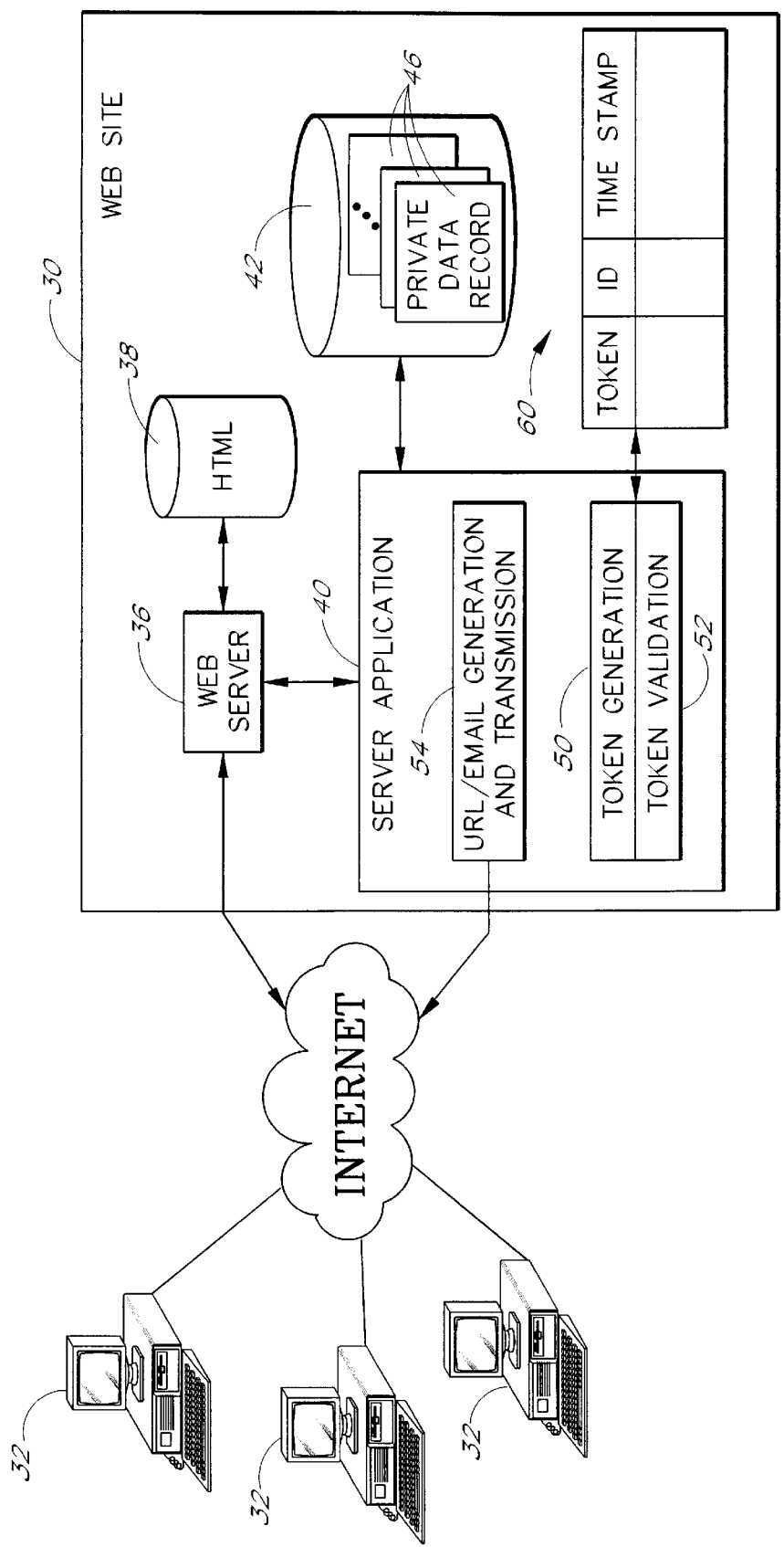
FIG. 1 illustrates a Web site system which operates in accordance with a preferred embodiment of the invention.

Throughout the drawings, reference numbers are re-used to indicate a general correspondence between referenced items.

DETAILED DESCRIPTION OF THE PREFERRED EMBODIMENTS

I. Overview

The present invention provides an automated method for enabling remote users of a Web site or other information system to securely access private Web pages or other resources without having to enter a password or other authentication information. The method is preferably implemented in a multi-user system in which different users have access to different private resources. (The term "private" is used herein to indicate a correspondence to a particular user or subset of users of a larger community of users.) The invention also provides several practical applications for the method, the details of which are described below under the heading "Example Applications."

Briefly, the method involves generating a unique, private URL (Uniform Resource Locator) that corresponds to a private resource, and conveying the URL (preferably by email) to the corresponding user or group of users that are to have remote access to the resource. Application code running on the server is used to validate the URLs and to thereby restrict access to the private resources. Each resource may, for example, be in the form of a private Web page which includes data from one or more private data records of a database or files of a file system. The resources may additionally or alternatively comprise server application functionality that allows users to perform particular types of transactions.

The method is particularly useful for enabling users of a merchant's Web site to access account-specific information and functions. For example, the method can be used to enable customers, suppliers, and/or business partners of a merchant to access information about business transactions with the merchant. This information may include payment and shipping information, information about prior and pending orders, subscription information, and other types of private information. The method may also be used to enable a user to securely perform a particular type of transaction, such as confirm an order, redeem an electronic gift certificate or coupon, or cast a vote.

In accordance with the invention, each private resource is assigned a private URL that includes a combination of a fixed character string and a unique token. The tokens may, for example, be in the form of fixed-length numeric or alphanumeric codes, although non-alphanumeric characters could be used. For example, a given private URL may be in the following form, where the string A9HBJ1E55G0ML is the token:

http://www.amazon.com/private_resources/A9HBJ1E55G0ML.

In this example, the string "amazon.com" identifies the amazon.com Web site, and the string "private_resources" identifies an application or area of the site that provides restricted access to a collection of private resources, such as a database of account records. The token identifies a particular private resource, such as by identifying a particular user, user group, file or database record.

Each private URL is preferably conveyed to the corresponding user (or group of users) within an email document—either as a simple character string or as part of a hyperlink. The use of email to convey the private URLs reduces the likelihood that unauthorized users will obtain access to the private URLs.

When a user attempts to access a resource which is referenced by a URL of the appropriate format (e.g., the format shown above), a token validation program is invoked to validate the token (and thus the URL). There is no need for the user to enter a username, password, or other authentication information during this process. If the token is found to be valid, the user is permitted to access the private resource; otherwise, access to the resource is denied. Access to the resource may, for example, involve the generation of a private Web page that is transmitted to the user. The private Web page may include information from a private database record, and/or may include a confirmation that a particular transaction associated with the URL was performed.

Where a hyperlink is used within the email, the user can access the private resource by simply selecting the hyperlink from within an email application that interacts with a browser program. The user can thus access the resource without having to remember or reenter the private URL. Where a simple character string is used, the user can cut-and-paste or otherwise reenter the URL string into the Web browser's address field. In either case, the user can save the URL in the browser's list of "favorite places" for future access.

Although email is preferred, other methods may be used to communicate the private URLs to users. For example, a private URL could be communicated as a hyperlink within an ordinary Web page, such as when a user initially sets up an account. Further, the URLs could be communicated by telephone, facsimile, or using another type of Internet document transmission protocol. Further, the token and non-token portions of the URLs could be transmitted to the user separately, such as by transmitting the token by email and the fixed URL portion by a publicly-accessible Web page.

To protect against the identification of valid private URLs, such as through trial-and-error, the range of allowable token values ("token space") is selected to be sufficiently large relative to the expected number of valid tokens so that the probability that a random guess within the token space will produce a valid token is very low. For example, if no more than $2^{20}$ (about one million) tokens are expected to be valid at any given time, and 64-bit tokens are used (providing a token space of 0 to $2^{64}-1$), the likelihood that a random guess within the token space will produce a valid token will be no more than one in $2^{64}/2^{20}=2^{44} \cong 1.78 \times 10^{13}$. The token space may, but need not be, continuous.

To further protect against the unauthorized identification of valid tokens, the tokens are generated using an algorithm which tends to distribute the issued tokens randomly within the token space. Any of a variety of known algorithms, or combinations of algorithms, may be used for this purpose. In one embodiment, for example, which is described with reference to FIGS. 3A and 3B, each token is generated by encrypting a data value that includes a time stamp and an identifier of a user. In another embodiment, which is described below with reference to FIGS. 4A and 4B, the tokens are generated using a pseudo-random number generation algorithm, and are stored in a look-up table which maps outstanding (valid) tokens to user identifiers. Other techniques for generating the tokens include using a secure table a pseudo-random sequence of values, and using a challenge-response type program or hardware device.

Because the tokens are distributed substantially randomly throughout a large token space, the set of valid tokens at any given time will generally represent a sparse subset of the token space. Such sparse distribution impairs the ability of a user to identify a valid token by modifying other valid tokens.

To further enhance security, the executable program used to validate tokens can be configured to prevent large numbers of tokens from being tested (such as by using a specially-written trial-and-error client program) in a short period of time. This may be accomplished, for example, by including a delay routine within the validation program to introduce a delay (e.g., one second) into the validation process, and/or by configuring the validation program to process no more than a pre-selected number (e.g., 2) of token validation requests at a time.

In one embodiment, the issued tokens (and thus the private URLs) automatically expire following a predetermined time period, such as 3 days. This may be accomplished, for example, by encoding time information (such as a creation or expiration time/date) into the tokens, or by storing such time information in a look-up table. The tokens may additionally be caused to expire after a pre-specified number of uses. For example, if the information is sufficiently sensitive, the URL may be set to expire after a single access to the private Web page. Upon the expiration of a user's private URL, a new URL may be generated automatically and conveyed to the user (such as by email). Alternatively, the URLs may be generated and conveyed to the user when the user performs a particular type of action on the Web site, such as submitting a form. Providing URLs which automatically expire further enhances security by (a) limiting the utility of a valid URL that is discovered by improper means, and (b) in implementations in which replacement URLs are not immediately generated upon expiration, reducing the number of valid tokens.

One benefit of the above-described URL generation/validation method is that it provides a very simple and efficient mechanism for allowing users to access private resources, such as personal account information. Another benefit is that the private URLs can be generated and issued to a user (and subsequently validated) even if very little information is known about the user. For example, the method can be used where the only information known about the user is the user's email address, as in the email-based recommendation service described below. Another benefit is that the level of security can be controlled by adjusting the size of the token space, such as by adjusting the number of bits used to represent token values. Another benefit is that the method does not require the user to download any special authentication program, or to consistently use the same computer.

II. General Architecture and Operation (FIGS. 1 and 2)

Figure 2:
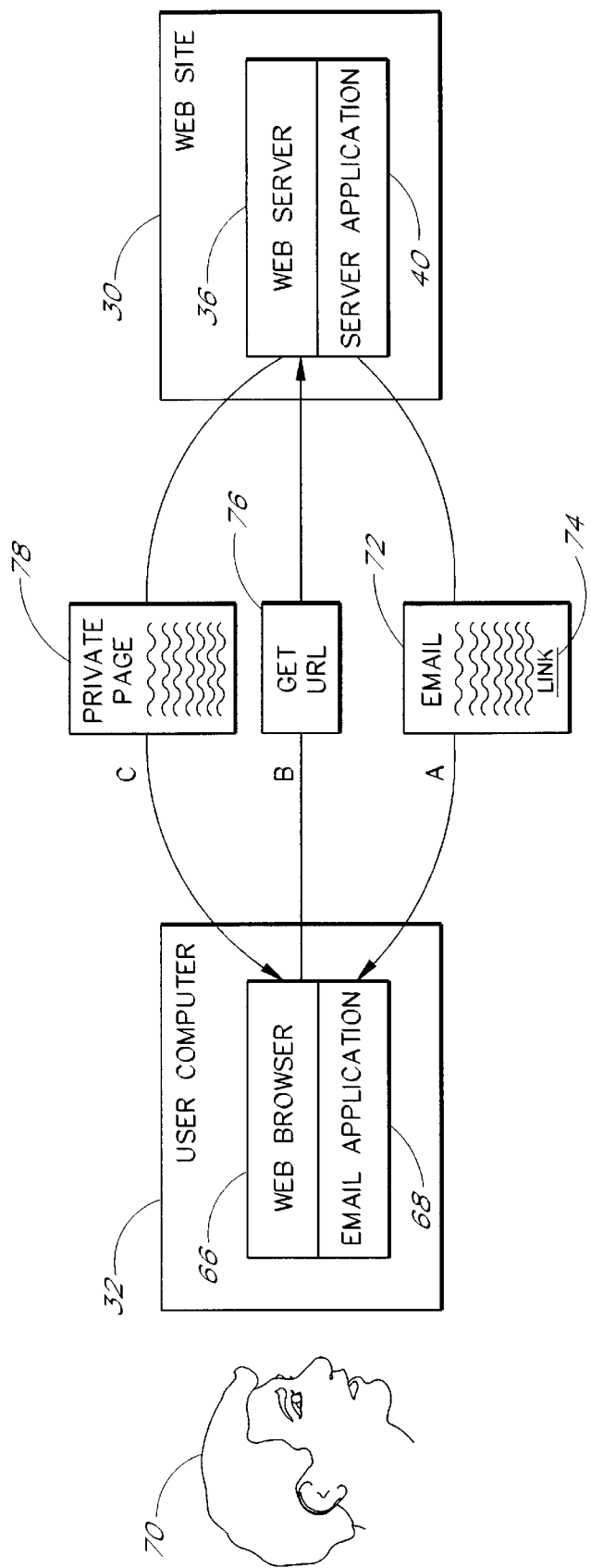
FIG. 2 illustrates a sequence of transmission events between a user computer and the Web site in the system of FIG. 1.

FIG. 1 illustrates a Web site 30 which is accessible via remote user computers 32 via the Internet, and illustrates a basic set of Web site components that may be used to implement a preferred embodiment of the invention. In the example shown, the private resources include private data records 46 that are accessed using private Web pages. For purposes of illustration, it may be assumed that each data record 46 corresponds to respective user, and is accessible via a respective private Web page which has a private URL assigned thereto. In the illustrated embodiment, the private URLs are conveyed to the users by email within hyperlinks. (The term "hyperlink" is used herein to refer collectively to a URL and to the corresponding document element which is selectable by a user to access a resource associated with the URL.)

As depicted by FIG. 1, the Web site 30 includes a Web server 36 which provides access to a store 38 of HTML (Hypertext Markup Language) content. The Web server may, for example, include a commercially available Web server program which runs on one or more general-purpose Unix or Windows NT based computers. The HTML store 38 stores various Web page components, including HTML that are used to dynamically generate private Web pages.

The Web server 36 communicates with an application program 40 ("server application") which provides restricted access to a back-end database 42. As described below, the server application may, for example, implement a particular user service, such as an email notification service, an order processing service, or an electronic gift certificate or coupon service. The server application 40 may, for example, run on the computer or set of computers used to implement the Web server 36.

The back-end database 42 includes private data records 46, wherein different records are private to different users (or possibly groups of users). The data contained in the data records 46 is dependent upon the type of service provided by the server application 40. Each data record may, for example, include account information for a respective user of the Web site, and/or may include data that is dynamically updated by other processes of the Web site. The data records 46 are retrievable from the database 42 using email addresses or other identifiers of corresponding users. The private data records 46 are accessible to users via private Web pages generated by the Web server 36.

As further depicted in FIG. 1, the server application 40 includes token generation code 50 that is used to generate and issue tokens. Typically, each issued token will correspond to a particular private data record 46 within the back-end database 42. A token could alternatively correspond to a set of private data records, such as all of the records that correspond to a given user. Further, the tokens could corresponds to particular application functions that can be performed with respect to the data records.

The server application 40 also includes token validation code 52 that is used to determine whether tokens contained in properly-formatted URL requests are valid. The server application also includes URL/email generation code 54 which is responsible for generating URLs which contain issued tokens, and conveying such URLs to users by email as hyperlinks.

As further depicted in FIG. 1, the token generation and validation code 50, 52 may use a table 60 to keep track of issued tokens. In the example shown, each entry in the table 60 includes a token, an ID, and a time stamp. The ID may, for example, be a user ID (such as an email address) or a pointer to a particular private data record 46 or other resource. The time stamp preferably includes information which may be used to determine whether the token has expired, such as a creation date, an expiration date, or a duration of time since the last user access to a corresponding private data record. Where time stamps are used, a software routine may be provided to automatically delete table entries that contain expired tokens. The table entries may optionally be encrypted to protect against unauthorized access to the table.

FIG. 2 illustrates an example sequence of transmission events A–C which may occur between a user computer 32 and the Web site 30 during use of the FIG. 1 system. It is assumed that the database 42 contains the email address of the user 70, and contains a private record 46 for which access by the user is desired. The email address and the data contained in the private record may be obtained by the Web site, for example, when the user submits an electronic form to set up an account. The user computer 32, which may be a PC or other general-purpose computer, has installed thereon a Web browser 66 which is in integrated with or otherwise interacts with an email application 68.

As depicted by event A, the server application 40 generates and transmits to the user 70 an email document 72 which includes a hyperlink 74 to a private URL. The email document 72 may also include a description of the function (s) performed by the hyperlink 74. To generate the hyperlink 74, the server application 40 initially invokes its token generation code 50 (FIG. 1) to generate a token that uniquely corresponds to the user's private data record 46. This token is then combined with a fixed character string to form the URL, and the URL is incorporated into the email document 72 within the HREF (hypertext reference) portion of the hyperlink 74. As is conventional, the URL itself may be hidden from the user during normal display of the document, and may be represented within the document as underlined text or a button. Alternatively, the URL may be made viewable so that the user can easily copy the URL for future use. As indicated above, the private URL could alternatively be communicated to the user using an ordinary Web page or another transmission method.

As depicted by event B, when the user requests the private URL (such as by selecting of the hyperlink 74 from within the email application 68), the browser 66 submits a GET URL message 76 to the Web site 30. In response to the GET URL message 76, the Web server 36 passes the token to the server application 40, and the server application invokes its token validation code 52 to determine whether the token is valid. If the token is found to be invalid or expired, an appropriate error message may be returned to the Web server 36 for transmission to the user computer 32.

If the token is valid, the server application 40 maps the token to the corresponding data record 46, and returns data contained therein to the Web server 36. The server application 40 may additionally or alternatively perform other types of actions associated with the URL. For example, the server application 40 may automatically issue a new private URL (with a new token) which supersedes the existing private URL, or may update a database to reflect that the private URL was accessed. For example, in a gift certificates embodiment described below, the server application additionally responds to the private URL request by crediting the user's account with a gift certificate amount.

As depicted by event C, if the token (and thus the URL) is found to be valid, the Web server 36 generates and returns a private Web page 78 which contains data from the private record 46. The private Web page may, for example, include a form for allowing the user to update the information. The private Web page may additionally or alternatively include a message confining that a particular action associated with the private URL was performed. For example, the private Web page 78 could confirm that an electronic gift certificate amount was credited to the user's account (as in FIG. 10, described below).

In other embodiments, the email document 72 could include multiple private URLs/hyperlinks 74 for allowing the user to perform different types of actions. For example, in the context of an order processing system, the email document 72 could have one URL for allowing the user to confirm the order, and another URL for allowing the user to cancel the order. Each of these URLs could include the same token but a different fixed text string, or could include identical text strings and different tokens.

III. Token/URL Generation and Validation (FIGS. 3 and 4)

Figure 3A:
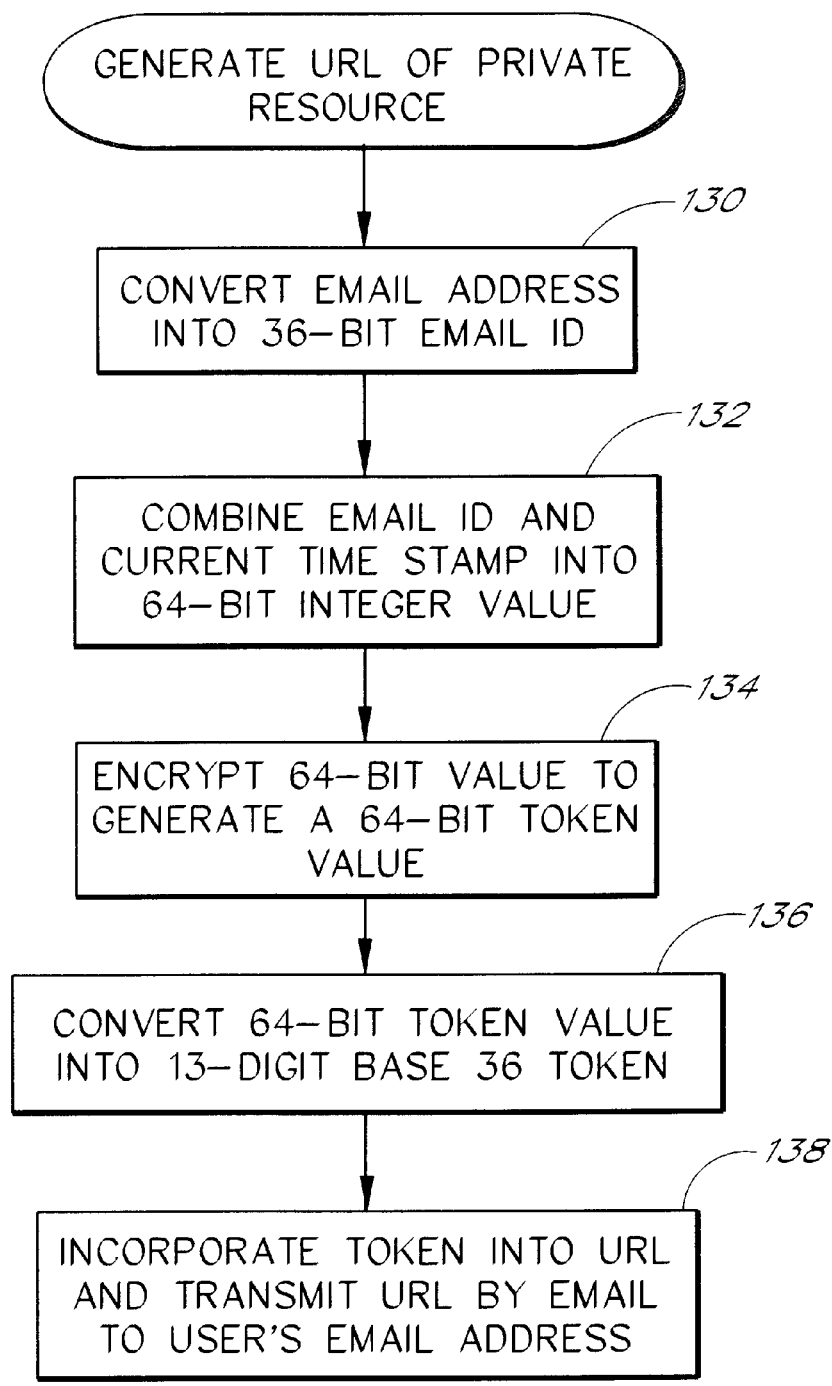
FIGS. 3A and 3B illustrate a method for generating and validating private URLs in the system of FIG. 1.
Figure 3B:
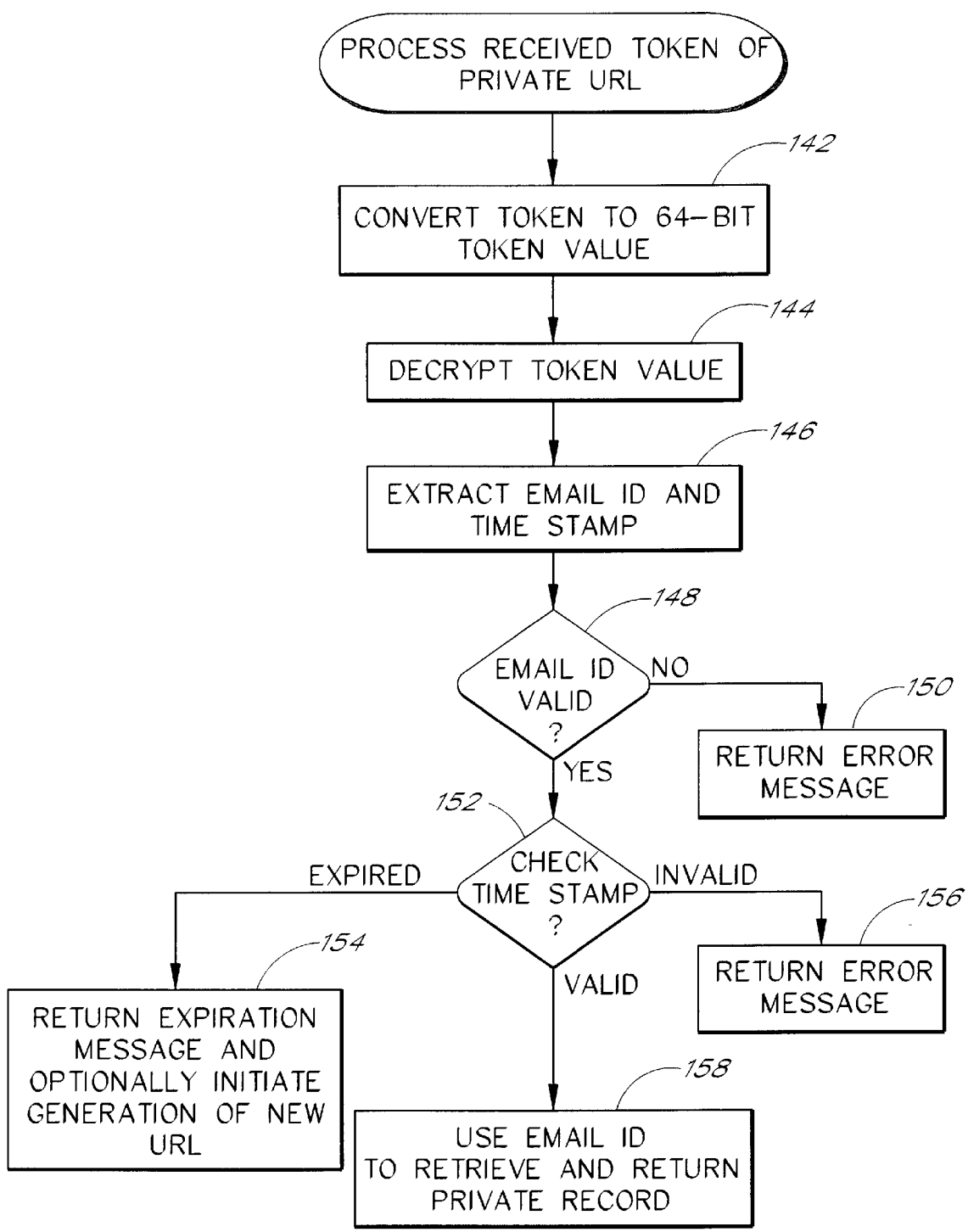

FIGS. 3A and 3B illustrate a token generation/validation method that is implemented by the server application 40 (FIG. 1) in accordance with one embodiment of the invention. In this embodiment, the information needed to validate tokens, and to map the tokens to private data records 46 or other private resources, is encoded within the tokens. One benefit of this method is that it does not require the use of a table or other data structure to keep track of issued tokens.

Briefly, the token generation process of FIG. 3A is invoked each time a private URL is created, and involves encoding the user's email address and a time stamp into the token and embedding this token within a URL. The corresponding token/URL validation process of FIG. 3B is invoked when a user attempts to access a URL of the predefined format needed to access the private records 46, and involves using the email address and time stamp encoded within the token to determine whether the token is valid. If the token is valid, the server application 40 validation process allows the user to access the private record 46 corresponding to the email address.

To generate a token (FIG. 3A), the user's email address is initially converted into a unique, 36-bit email ID (step 130). Any algorithm which reversibly converts alphanumeric strings into fixed-length binary values can be used for this purpose. In step 132, the email ID and a time stamp which represents the current date and time are combined into a 64-bit integer value. The time stamp may, for example, be a Unix-based time stamp (or a rounded-off version thereof) which represents the number of seconds since 1970. Inclusion of the time stamp provides a mechanism for later determining whether the token has expired. The time stamp may alternatively be in the form of an expiration date/time.

In step 134, the 64-bit value is encrypted to generate a 64-bit token value. An encryption method which tends to randomly and uniformly distribute the tokens over the 64-bit space of possible token values is preferably used for this purpose. Well-known types of encryption algorithms such as DES and Blowfish are suitable for this purpose. In step 136, the 64-bit token value is compacted by converting the 64-bit value into a 13-digit base 36 value. This 13-digit value is used as the token. The token is sufficiently short in length to allow users to easily type-in the token manually (if desired). In step 138, the token is combined with a predefined character string to form the private URL, which is in-turn incorporated into an email document 72 (preferably within a hyperlink 74) that is transmitted to the user. The predefined character string includes one or more fields that are recognized by the Web server 36 as corresponding to the server application 40.

To validate a URL having the proper format for accessing the private records, the Web server 36 passes the token to server application 40. As depicted by FIG. 3B, the server application initially converts the token to binary form (step 142) and then decrypts the binary token value (step 144). The time stamp and the email ID are then extracted from the resulting value (step 146). In step 148, the Web site's email address database (not shown) is accessed to determine whether the email ID is valid (corresponds to an email address of a known user). If the email ID is invalid, an error message is returned to the Web server 36 (step 150), and ultimately to the user's Web browser 66.

In step 152, the server application 40 determines whether the time stamp is valid, expired, or invalid. In one implementation, the time stamp is treated as valid if it is 0 to N days old (where N is a preselected integer between 0 and 365), expired if N days to one year old, and invalid if less than 0 days or greater than one year old. The value of N can be selected according to the specifics of the particular application and the desired level of security. If the time stamp is either expired or invalid, an appropriate message is returned (steps 154 and 156). A determination that the time stamp has expired may also trigger the generation and transmission of a replacement URL via the FIG. 3A process.

If the email ID and the time stamp are valid, the email ID is used to retrieve the private record 46 to be accessed (step 158). The private record 46 may, for example, be a record of the user's account data. This record, or a portion of the record, may be returned to the user's browser 66 within a private Web page. As described above, the server application 40 may additionally or alternatively update a database or perform some other type of action in this event.

As indicated above, the FIG. 3B process may also include an appropriate delay routine (not shown), and/or be configured to limit the number of URL validations that can be performed concurrently, to thereby limit the number of tokens that can be tested in a given amount of time.

In the above implementation, many different token values (only one of which was conveyed to the user) can map to the same private record 46, since only the email ID and not the time stamp uniquely corresponds to the private record 46. As a result, a token can be valid even though it was never issued to a user. To reduce the number of valid tokens, the token generation process (FIG. 3A) could be modified, for example, to record the time stamps within a table, and the validation process (FIG. 3B) modified to require that the extracted time stamps match time stamps within this table. Any of a variety of other methods could be used to achieve a similar result.

Figure 4A:
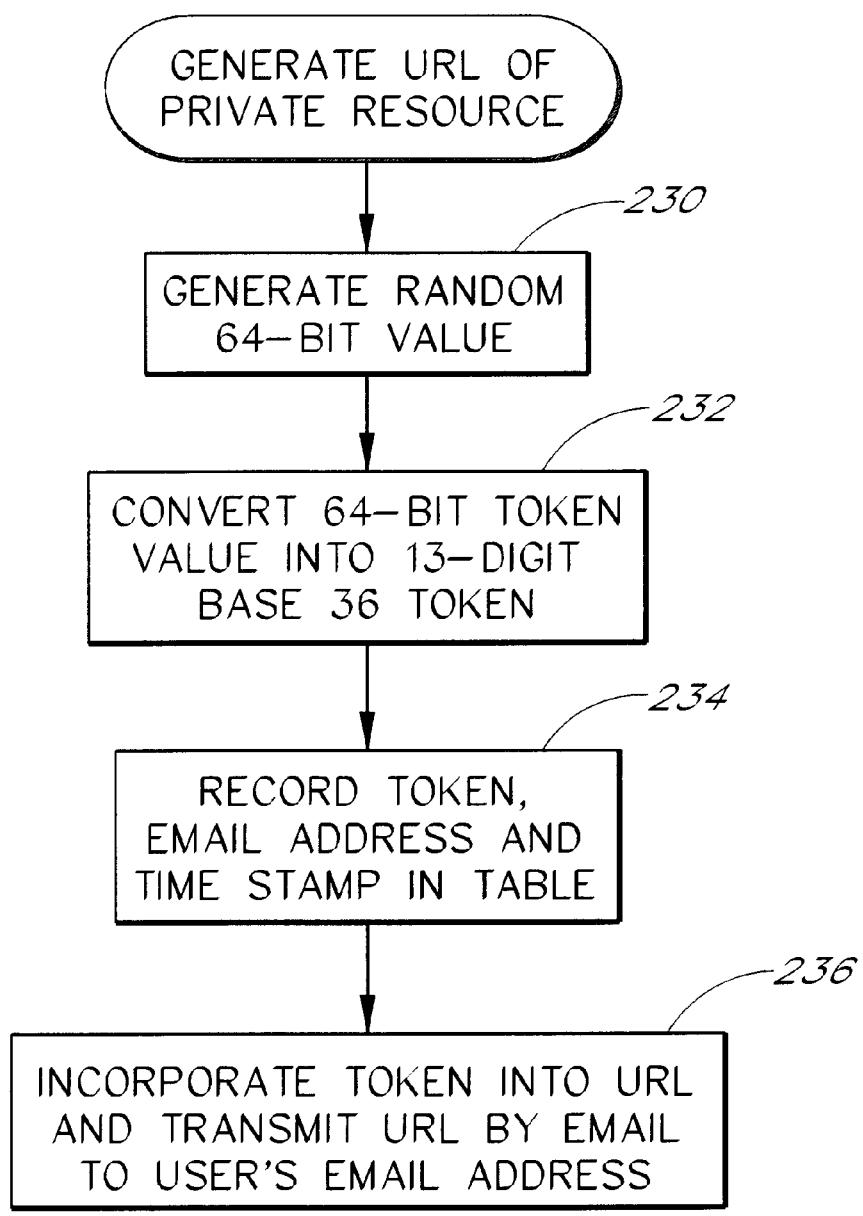
FIGS. 4A and 4B illustrate an alternative method for generating and validating private URLs in the system of FIG. 1.
Figure 4B:
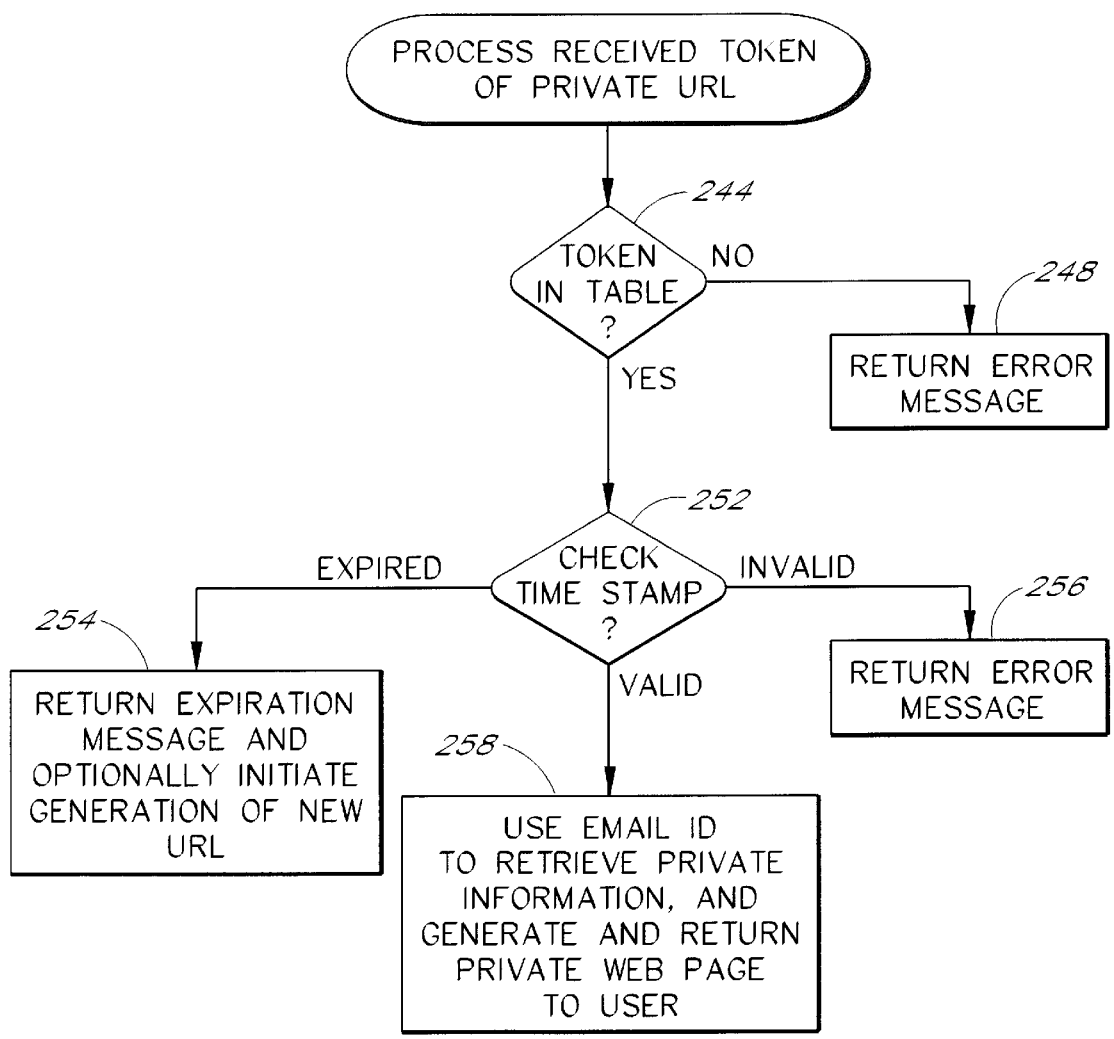

FIGS. 4A and 4B illustrate an alternative, table-based token generation/validation method which may be implemented by the server application 40. In this embodiment, no information is encoded within the tokens. Initially, an appropriate algorithm, such as a pseudo-random number generation algorithm, is used to generate a random 64-bit token value (step 230). The token is then compacted into a 13-bit base 36 token (step 232), and the token, the user's email address, and the time stamp are recorded as an entry in the table 60 (step 234). If the token is a replacement for a previously-issued token, the superseded table entry is deleted (not shown). The token is then incorporated into a URL, and the URL is sent (preferably within a hyperlink) to the user's email address. The server application 40 may include executable code (not shown) which deletes aged entries from the table 60, such as those having tokens that are over one year old.

As depicted by FIG. 4B, to validate a token received in an appropriately-formatted URL, the table 60 is initially accessed (step 244) to determine whether the token exists in the table. If no entry is found in the table 60, an appropriate error message is returned (step 248). Otherwise, the corresponding email address and time stamp are read from the table, and are processed as described above for steps 152–158 of FIG. 3B.

The above-described token generation and validation methods can also be used to control access to other types of private resources. In addition, in applications in which another user of a group of users is to have access to the private record, the email address(es) such other user(s) may be encoded within the tokens or stored in the table 60.

IV. Example Applications (FIGS. 5–10)

Several practical applications for the above-described system and methods will now be described. Two of these applications are illustrated through example screen displays.

Figure 5:
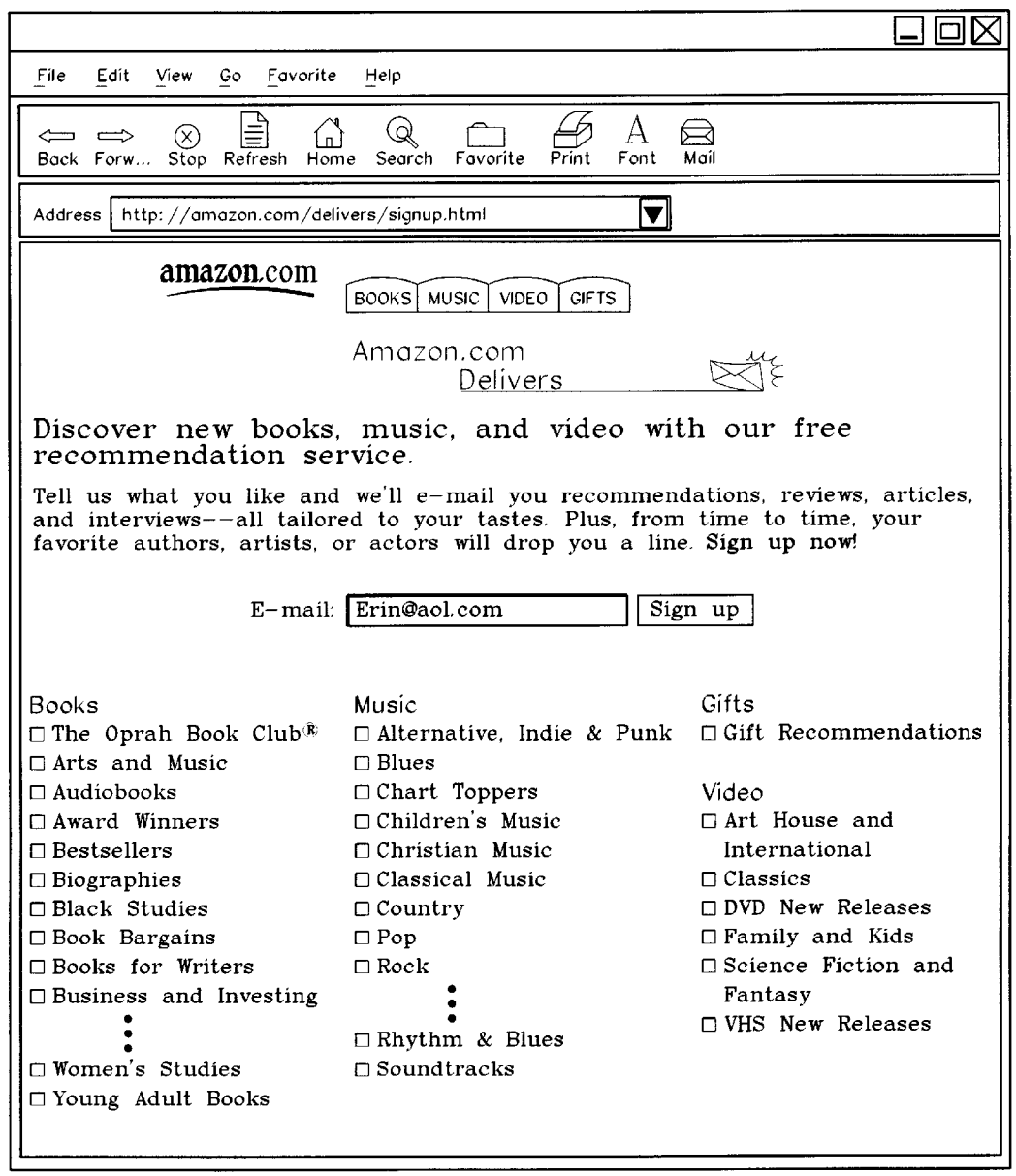
FIGS. 5–7 illustrate a form Web page (FIG. 5), an email document (FIG. 6), and a private Web page (FIG. 7) in an email recommendation service embodiment of the invention.
Figure 6:
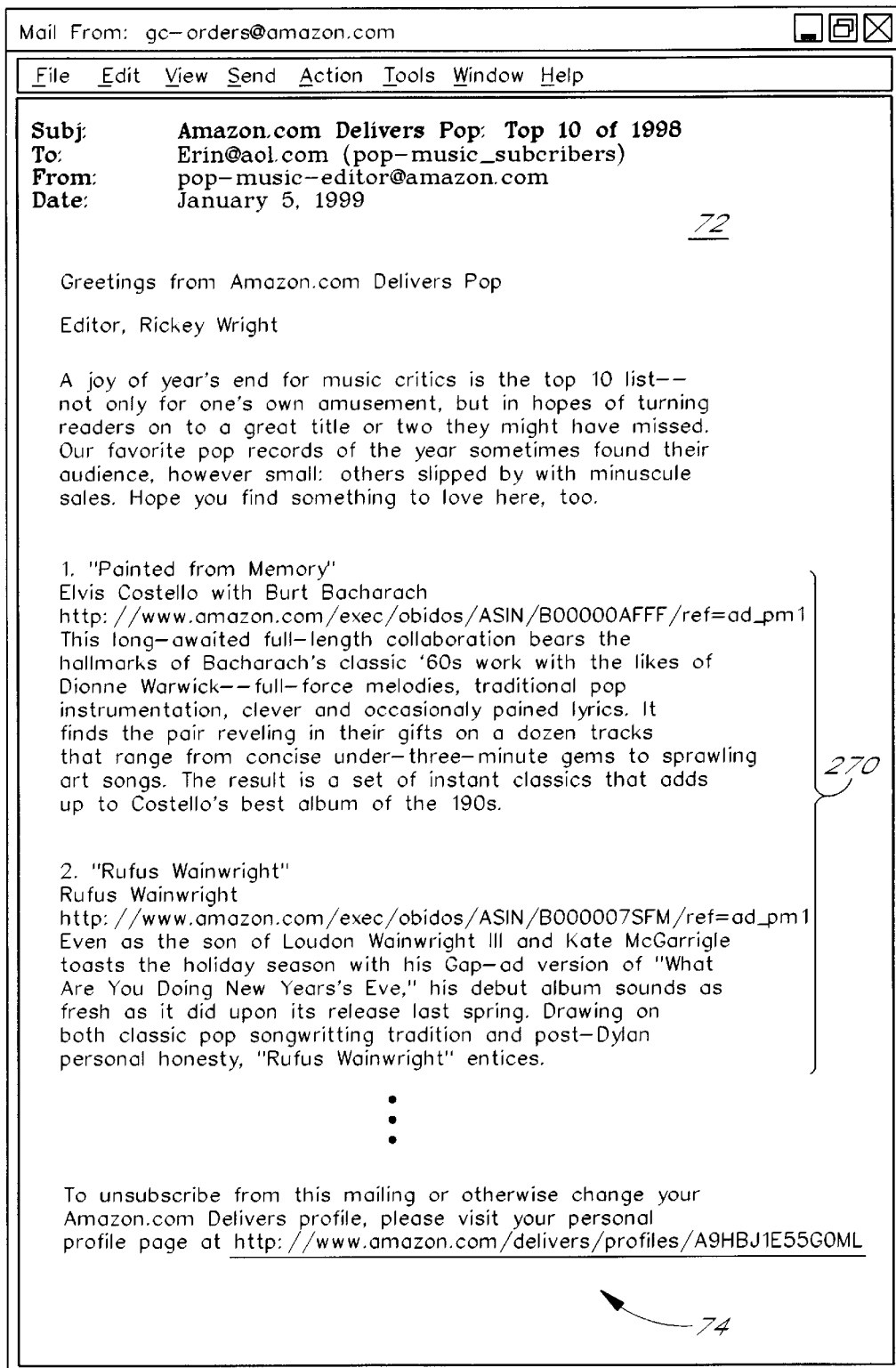
Figure 7:
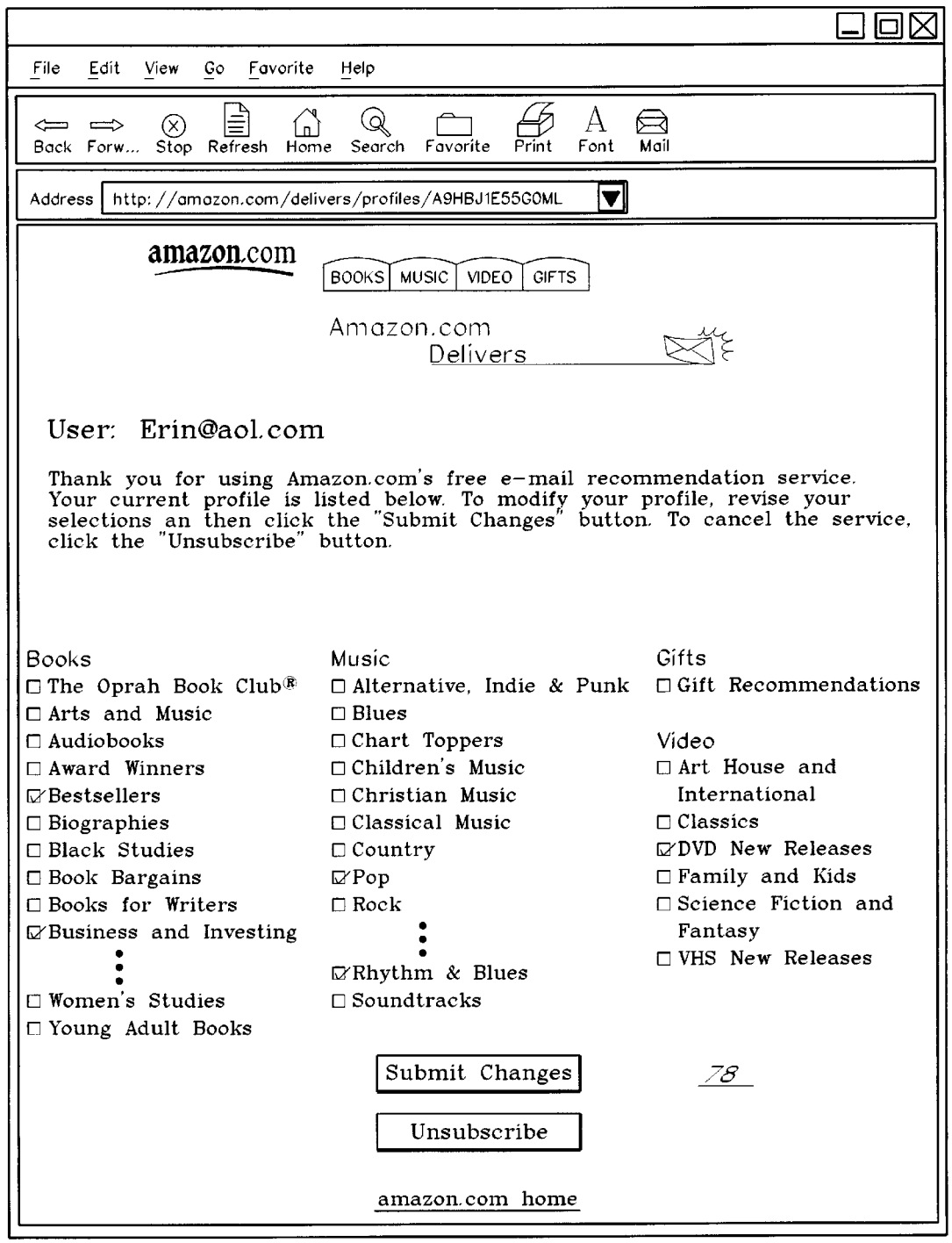

FIGS. 5–7 illustrate, in example form, a particular application in which the server application 40 (FIG. 1) implements an automated email-based recommendation and notification service of the Amazon.com Web site. As depicted by the Web page of FIG. 5, the user subscribes to the service by completing and submitting an online form. The form prompts the user to enter the user's Internet email address, and to select one or more categories of books, music, gifts and videos (by selecting appropriate check boxes) for which to receive information about Amazon.com's product offerings. In the preferred embodiment, the user can, but need not, have a preexisting account with the Amazon.com Web site. Users can subscribe to the service without submitting or otherwise disclosing any additional information.

FIG. 6 illustrates the general form of an example email document 72 transmitted to the user by the service. The email document includes descriptive content 270 about selected products that fall within one or more of the categories selected by the user. This information may include, for example, information about new releases, editorial information, and/or information about specials offered by the merchant. Where the user is an existing customer, the recommendations and other content may be based in-part on information known about the user, such as the user's purchase history.

The email document 72 also includes a hyperlink 74 to a private Web page 78 (FIG. 7) that can be used to modify the subscription profile or cancel the service. The URL referenced by the hyperlink 74 is generated and validated as described above. The user can thus subscribe to the service, and thereafter securely modify the subscription profile, without the need for a password, username, or other authentication information, and without the need to disclose any personal information other than an email address and subscription profile. With reference to FIG. 7, the URLs (not shown) associated with the "Submit Changes" and "Unsubscribe" buttons may include the token, a session ID, or some other identifier that can be used to track the user.

Figure 9:
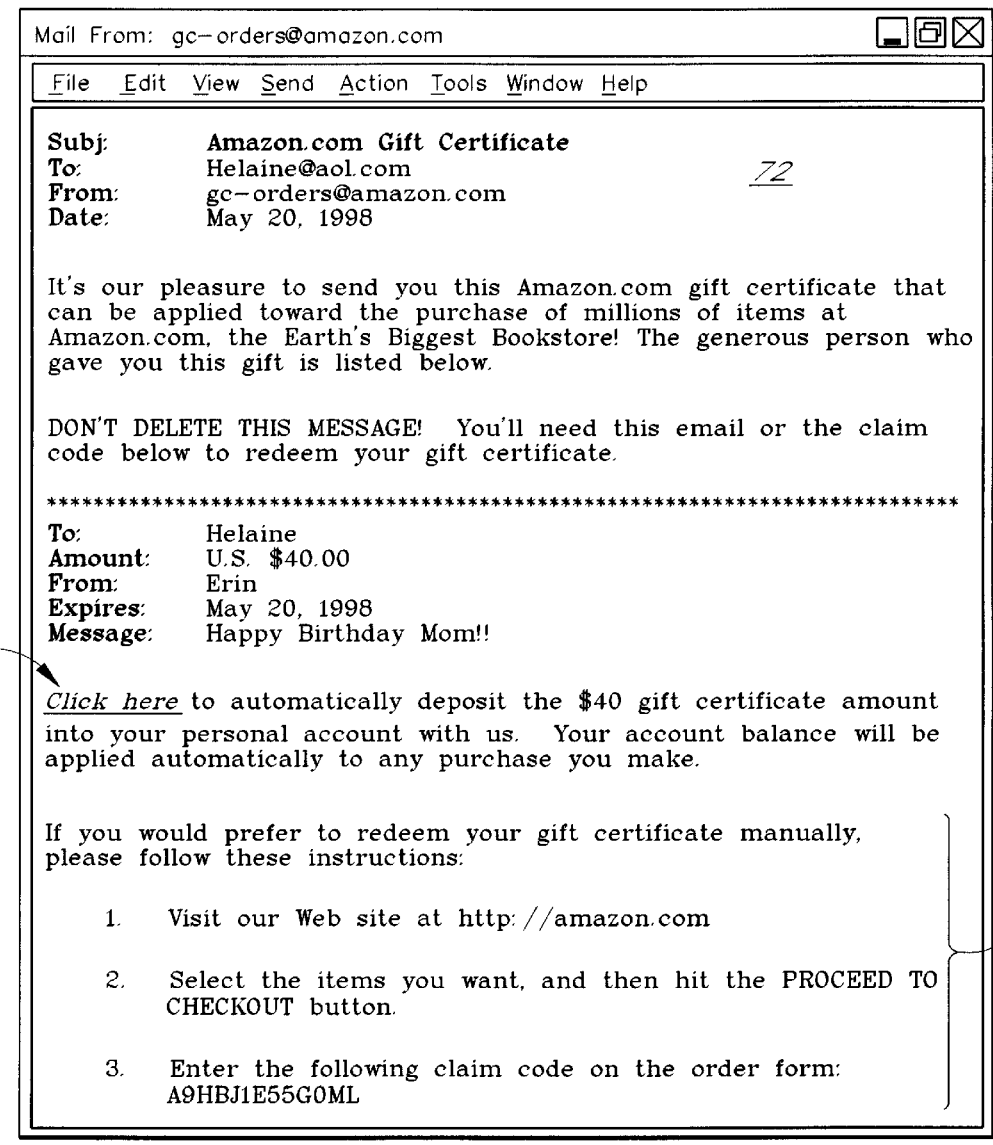
Figure 10:
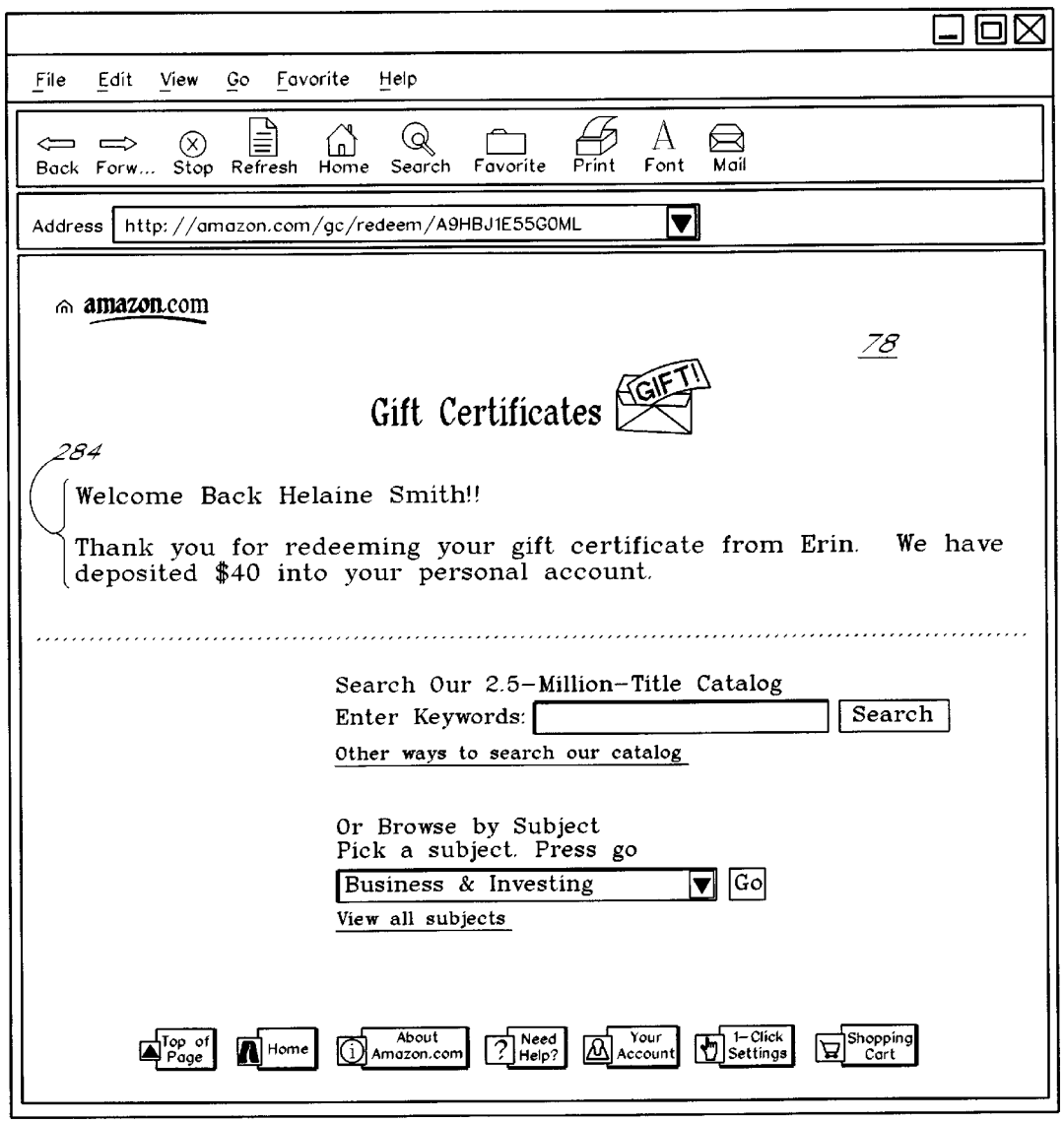

Another application, which is illustrated in example form by FIGS. 8–10, involves providing a secure method for redeeming electronic gift certificates. In this application, the server application 40 (FIG. 1) implements an electronic gift certificate system which allows users of a merchant's Web site 30 to purchase electronic gift certificates for other users. To purchase a gift certificate, a purchaser initially fills out and submits a form page (FIG. 8) which requests, among other things, the recipient's email address and a gift certificate amount. Other form pages (not shown) are thereafter completed and submitted to pay for the gift certificate. The server application 40 responds to the gift certificate purchase by sending the recipient an email document 72 of the form shown in FIG. 9, and by recording associated information (including the token and the gift certificate amount) in the database 42 (FIG. 1).

The email document 72 includes a hyperlink 74 for automating the process of redeeming the gift certificate. The token which is included within the hyperlink 74 acts as a gift certificate redemption code which directly or indirectly specifies the recipient and the gift certificate amount. It is assumed in the illustrated example that the recipient already has an account with the merchant. In the embodiment shown, selection of the hyperlink 74 causes the server application 40 to automatically credit the gift certificate amount to the recipient's personal account with the merchant. The user may alternatively be presented with one or more options for redeeming the gift certificate. As indicated by the description 280 (FIG. 9) at the bottom of the email document, the user may alternatively redeem the gift certificate by manually entering the 13-digit token into an order form during checkout.

As shown in FIG. 10, selection of the hyperlink 74 also causes the Web site to return a private gift certificate redemption page 78. The private redemption page 78 includes a message 284 confirming that the gift certificate amount was credited to the recipient's account. From this Web page 78, the user can initiate a search of the merchant's offerings. Additional details of the illustrated gift certificate system are described in U.S. Pat. application No. 09/153,632, filed Sep. 15, 1998, the disclosure of which is hereby incorporated by reference.

Another practical application (not separately illustrated) involves sending the user 70 (FIG. 2) an email document 72 or a Web page which includes a one-time-use URL (preferably as a hyperlink 74) to a private discount page 78. The discount page 78 may, for example, give the user a 10% discount off the user's next purchase. Other users of the system would be sent like emails but which contain different tokens. In this application, the server application 40 would use the tokens to prevent users from obtaining multiple discounts. This may be accomplished, for example, by deleting each issued token from a table once the token has been used.

Another application (not separately illustrated) involves providing restricted access to account information in the context of orders for goods. In one embodiment, for example, when a user 70 (FIG. 2) places an order on a merchant's Web site 30, the private URL/hyperlink 74 is transmitted to the user via an order confirmation email 72, and provides access to a private Web page 78 that includes order status information or other account-related information. The private Web page 78 may include links or a form for allowing the user to modify the order.

In another practical application (not separately illustrated), the user 70 is a supplier of goods that are sold via the Web site 30 of a retailer, and the server application 40 is used to place orders with the supplier. To place an order, the server application 40 generates and transmits to the supplier an email document 72 which preferably includes the following: (a) a description of the goods being ordered, (b) a hyperlink 74 to a private URL (generated as described above), and (c) a message instructing the recipient to select the hyperlink to confirm the order. The email document 72 may be generated automatically, such as when inventory falls below a certain threshold, or may be generated in response to an action performed by a user. When the user 70 selects the hyperlink 74, the server application 40 updates a database to indicate that the order was confirmed, and the Web server 36 returns a private Web page 78 which includes information (e.g., order history, balance due) about the supplier's account with the retailer.

Another application (not separately illustrated) involves providing a group of users secure access to a gift registry. In this application, a user that sets up the gift registry specifies the email addresses of the desired group members. The server application 40 then generates a private URL to a private page 78 which includes updated status information with respect to the gift registry, and transmits the private URL by email to each group member 70. Yet another application (not separately illustrated) involves implementing an online voting scheme for allowing Internet users to securely cast votes. In this application, the server application 40 generates and transmits email documents 72 to all users that are registered to vote. Each private URL within such an email document 72 represents a particular vote by a particular user. For example, in an election for a single, yes/no proposition, each email document might include a first hyperlink 74 which can be selected to cast a "yes" vote, and a second hyperlink 74 which can be selected to cast a "no" vote. The URLs associated with these two hyperlinks could differ either in their token or non-token portions (or both). Thus, during the token/URL generation phase, the server application 40 would generate a unique private URL for every possible vote for every possible user. During the token validation phase, the server application 40 would ensure that the vote being cast is not redundant of or inconsistent with any prior votes.

Another application (not separately illustrated) involves providing security in an electronic greeting card system, such as the Web-based system of Blue Mountain Arts. In this type of system, the private URLs reference electronic greeting card Web pages 78 that are customized by other users. For example, by accessing a greeting card creation area of the Web site, a user can select and customize a private Web page/greeting card and have the URL of this card sent by email to a designated recipient 70. Use of the URL generation/validation methods of the invention in this environment would provide increased privacy of the greeting cards.

Although this invention has been described in terms of certain preferred embodiments and applications, other embodiments and applications that are apparent to those of ordinary skill in the art, including embodiments which do not provide all of the features and advantages set forth herein, are also within the scope of this invention. For instance, although the invention has been described in the context of access to Web pages and other Internet resources, the underlying methods can also be used to provide secure access to other types of addressable resources, including resources accessed through proprietary protocols. Accordingly, the scope of the present invention is intended to be defined only by reference to the appended claims.

What is claimed is:

1. In a Web site system in which different users are provided access to different private resources, a computer-implemented method of providing a user secure access to a private resource over a publicly-accessible network without requiring the user to enter authentication information, the method comprising:

obtaining an email address of the user;

generating a token using a token generation method that distributes tokens substantially randomly over a token space, the token space selected to be sufficiently large to inhibit identification of a valid token by trial and error, wherein generating the token comprises generating a token value of at least 64 bits;

combining the token and a predefined character string to form a uniform resource locator (URL) which corresponds to the private resource;

generating an email message which includes the URL, and transmitting the email message to the email address of the user; and in response to receiving a request for the URL over the publicly-accessible network from a user, accessing the resource without requiring the user to enter authentication information.

2. The method of claim 1, wherein the resource comprises personal account information stored in a database, and accessing the resource comprises returning to the user a private Web page which includes the account information.

3. The method of claim 2, wherein the account information includes a subscription profile for an email-based subscription service, and the private Web page includes an electronic form for modifying the subscription profile.

4. The method of claim 1, wherein accessing the resource comprises transmitting to the user a Web page that contains an electronic greeting card created for the user by another user.

5. The method of claim 1, wherein accessing the resource comprises updating a database to indicate that the private URL was accessed.

6. The method of claim 5, wherein updating the database comprises crediting an account of the user with a monetary amount.

7. The method of claim 5, wherein updating the database comprises confirming an order.

8. The method of claim 5, wherein updating the database comprises recording a vote placed by the user.

9. The method of claim 1, wherein accessing the resource comprises accessing a gift registry of another user.

10. The method of claim 1, wherein generating the token comprises using at least one of an encryption algorithm and a pseudo-random number generation algorithm.

11. The method of claim 1, generating the token comprises encoding the email address of the user within token, and accessing the resource comprises extracting the email address from the token to identify the user.

12. The method of claim 1, further comprising storing the token in a table which maps valid tokens to user identifiers, and wherein accessing the resource comprises accessing the table to identify the user.

13. The method of claim 1, further comprising invalidating the private URL after at least one of (a) a single use, and (b) a predetermined period of time.

14. The method of claim 1, wherein generating the token comprises encoding a timestamp within the token.

15. The method of claim 1, wherein generating the token is performed automatically in response to an electronic form submission by the user.

16. A computer system for providing secure Web-based access to private resources over a publicly-accessible network without requiring users to enter authentication information, comprising:
  a database which includes a plurality of private records, wherein different private records correspond to different users; and
  a server system which communicates with Web clients over the publicly-accessible network to provide restricted user access to the private records, the server system including a server application that (a) generates tokens which correspond to specific private records such that outstanding tokens are distributed substantially randomly over a token space, wherein each of said tokens comprises at least 64 bits, (b) generates private uniform resource locators (URLs) which include the tokens, (c) transmits the private URLs to corresponding users to enable the users to access corresponding private records, and (d) validates tokens received from Web clients in URL requests;
  wherein the server system responds to a URL request which includes a valid token by returning information contained in a private record which corresponds to the token, without requiring user entry of authentication information.

17. The computer system of claim 16, wherein the server application distributes the tokens over a token space which is sufficiently large to inhibit the identification of valid tokens by trial-and-error.

18. The computer system of claim 16, wherein the server application generates the tokens using at least one of an encryption algorithm and a pseudo-random number generation algorithm.

19. The computer system of claim 16, wherein the server system conveys the URLs to the users over the publicly-accessible network by email.

20. The computer system of claim 16, further comprising a table which maps tokens to private records, the table stored in memory and accessed by the server application.

21. The computer system of claim 16, wherein the server application encodes email addresses within the tokens, and extracts the email addresses from received tokens to determine whether the tokens are valid.

22. The computer system of claim 16, wherein the server application invalidates a token after at least one of (a) a single use, or (b) a predetermined period of time.

23. The computer system of claim 16, wherein the server system responds to a private URL that includes a valid token by generating and returning a private Web page.

24. The computer system of claim 23, wherein the server system implements an email-based subscription service in which the tokens are used to provide secure access to private Web pages that allow users to modify personal subscription profiles.

25. The computer system of claim 16, wherein the server system implements a gift registry system in which the private URLs provide access to private gift registries.

26. The computer system of claim 16, wherein the server system implements an electronic gift certificate system in which the tokens are used to redeem electronic gift certificates.

27. The computer system of claim 16, wherein the server system implements an electronic greeting card system in which the tokens are used to provide secure access to private greeting card Web pages.

28. The computer system of claim 16, wherein the server system implements an electronic voting system wherein a request for a private URL represents a vote by a user.

29. The computer system of claim 16, wherein the server system implements an electronic coupon system in which the private URLs provide one-time-use discounts to users.

30. In a Web site system of a merchant, a computer-implemented method of providing customized information to a user about products and/or services available from the merchant, comprising:
  obtaining an email address and a subscription profile from the user, the subscription profile indicating product and/or service categories selected by the user;
  transmitting to the user at least one email document which contains descriptions of products and/or services, the descriptions selected based on the subscription profile;
  generating and transmitting to the user a private uniform resource locator (URL) which provides access to a private Web page for at least securely revising the subscription profile, the URL containing a token which is generated using a method which distributes tokens substantially randomly over a token space; and
  responding to a client request for the private URL by returning the private Web page without requiring entry of authentication information.

31. The method of claim 30, wherein transmitting the private URL to the user comprises transmitting the URL by email.

32. The method of claim 30, wherein the method is performed without requiring the user to submit or specify any information other than the email address and the selected categories of products and/or services.

33. The method of claim 30, wherein generating the private URL comprises using at least one of an encryption algorithm and a pseudo-random number generation algorithm to generate the token.

34. The method of claim 30, wherein generating the private URL comprises encoding the email address of the user within token, and wherein responding to the client request comprises extracting the email address from the token.

35. The method of claim 30, wherein generating the private URL comprises encoding a time value within the token, and wherein responding to the client request comprises using the time value to determine whether the private URL has expired.

36. The method of claim 30, wherein generating the private URL comprises generating a token value which contains at least 64 bits.

* * * * *